(12) United States Patent
Patel et al.

(10) Patent No.: US 9,599,519 B2
(45) Date of Patent: Mar. 21, 2017

(54) CHARGING A BATTERY BASED ON STORED BATTERY CHARACTERISTICS

(71) Applicant: Apple Inc., Cupertino, CA (US)

(72) Inventors: Parin Patel, San Francisco, CA (US); Scott P. Mullins, Gilroy, CA (US)

(73) Assignee: Apple Inc., Cupertino, CA (US)

(*) Notice: Subject to any disclaimer, the term of this patent is extended or adjusted under 35 U.S.C. 154(b) by 210 days.

(21) Appl. No.: 13/726,506

(22) Filed: Dec. 24, 2012

(65) Prior Publication Data

US 2013/0234652 A1 Sep. 12, 2013

Related U.S. Application Data

(60) Provisional application No. 61/607,916, filed on Mar. 7, 2012.

(51) Int. Cl.
*H02J 7/00* (2006.01)
*G01K 13/00* (2006.01)
*G01K 1/02* (2006.01)

(52) U.S. Cl.
CPC .............. *G01K 13/00* (2013.01); *G01K 1/022* (2013.01); *H02J 7/00* (2013.01); *H02J 7/0004* (2013.01); *H02J 7/0091* (2013.01)

(58) Field of Classification Search
USPC ........ 320/107, 112, 116, 137, 140, 150, 162
See application file for complete search history.

(56) References Cited

U.S. PATENT DOCUMENTS

| | | |
|---|---|---|
| 3,534,241 A | 10/1970 | Wilson |
| 5,371,453 A | 12/1994 | Fernandez |
| 5,414,860 A | 5/1995 | Canova |
| 5,504,416 A | 4/1996 | Holloway |
| 5,886,527 A * | 3/1999 | Ito .................................. 324/431 |
| 5,912,548 A * | 6/1999 | Downs et al. ................ 320/150 |
| 6,005,367 A | 12/1999 | Rohde |
| 6,107,780 A | 8/2000 | Kellerman |
| 6,549,014 B1 | 4/2003 | Kutkut |
| 6,771,042 B2 | 8/2004 | Chen |
| 7,317,298 B1 * | 1/2008 | Burns et al. ................... 320/107 |
| 8,217,628 B2 | 7/2012 | Yang |
| 8,319,479 B2 | 11/2012 | Kao |
| 8,808,886 B2 | 8/2014 | Kim |

(Continued)

FOREIGN PATENT DOCUMENTS

| | | |
|---|---|---|
| CN | 1182482 A | 5/1998 |
| CN | 101295881 A | 10/2008 |

(Continued)

*Primary Examiner* — Brian Ngo
(74) *Attorney, Agent, or Firm* — Blank Rome LLP (57) ABSTRACT

The described embodiments include a power-management unit that receives and stores a representation of a temperature state of a battery pack from a battery-monitoring mechanism in a battery pack. For example, an interface circuit (such as a single-wire-interface or SWI circuit) may receive the information from the battery-monitoring mechanism via a signal line, and the information may be stored in a memory (such as a non-transitory computer-readable memory). This stored information is then used by a temperature-monitoring mechanism or circuit to determine the temperature state of the battery pack, which may be used to control or gate charging of a battery in the battery pack.

16 Claims, 6 Drawing Sheets

(56) References Cited

U.S. PATENT DOCUMENTS

| | | |
|---|---|---|
| 8,957,639 B2 | 2/2015 | Holsen |
| 2003/0117112 A1 | 6/2003 | Chen |
| 2004/0169489 A1* | 9/2004 | Hobbs .................. B60L 3/0046 |
| | | 320/104 |
| 2005/0099156 A1* | 5/2005 | Brenner ........................ 320/116 |
| 2005/0194935 A1* | 9/2005 | Kubota et al. ................ 320/128 |
| 2006/0139007 A1 | 6/2006 | Kim |
| 2006/0226814 A1* | 10/2006 | Formenti et al. ............. 320/128 |
| 2007/0090788 A1* | 4/2007 | Hansford et al. ............. 320/107 |
| 2007/0257642 A1 | 11/2007 | Xiao |
| 2008/0018300 A1 | 1/2008 | Zaag |
| 2008/0120513 A1 | 5/2008 | Kim |
| 2009/0039836 A1* | 2/2009 | Asada ........................... 320/152 |
| 2009/0174370 A1* | 7/2009 | Gilling et al. ................ 320/160 |
| 2009/0230923 A1 | 9/2009 | Hoffman |
| 2009/0295334 A1 | 12/2009 | Yang |
| 2010/0085018 A1 | 4/2010 | Cruise |
| 2010/0270973 A1 | 10/2010 | Miyazaki |
| 2012/0286732 A1 | 11/2012 | Cruise |
| 2013/0038293 A1 | 2/2013 | Seman |
| 2013/0082662 A1 | 4/2013 | Carre |

FOREIGN PATENT DOCUMENTS

| | | |
|---|---|---|
| CN | 101529646 A | 9/2009 |
| CN | 101741403 A | 6/2010 |
| EP | 0661769 A2 | 7/1995 |
| EP | 0936719 A2 | 8/1999 |
| EP | 1291999 A1 | 3/2003 |
| EP | 2293781 A2 | 3/2011 |
| JP | 2004311240 A | 11/2004 |
| JP | 2005131770 A | 5/2005 |

\* cited by examiner

CHARGING A BATTERY BASED ON STORED BATTERY CHARACTERISTICS

CROSS REFERENCE TO RELATED APPLICATIONS

This application claims priority under 35 U.S.C. §119(e) to U.S. Provisional Application Ser. No. 61/607,916, entitled "Charging a Battery Based on Stored Battery Characteristics," by Parin Patel and Scott P. Mullins, filed on Mar. 7, 2012, the contents of which is herein incorporated by reference.

This application is also related to: U.S. Patent Application Ser. No. 61/607,991, entitled "Communication and Monitoring of a Battery Via a Single Wire," by Parin Patel and Scott P. Mullins, filed Mar. 7, 2012, the contents of which are herein incorporated by reference.

BACKGROUND

Field

The described embodiments relate to techniques for monitoring and communicating with a battery pack. More specifically, the described embodiments relate to techniques for charging a battery based on stored representations of characteristics of a battery in the battery pack.

Related Art

The ever-increasing functionality and performance of portable electronic devices is, in part, due to advances in power sources, such as battery packs. Modern battery packs in portable electronic devices typically include circuits that monitor characteristics of the battery packs, such as the voltage across a battery in a battery pack, a charging current, an internal impedance, the available capacity, etc. This information is typically communicated to a host portable electronic device via one or more signal lines.

In addition, for safety reasons, it is often important to at least periodically monitor the temperature of the battery pack and/or the battery in the battery pack. For example, the temperature of the battery pack (and, more generally, a temperature state of the battery pack) may be monitored during charging using a temperature sensor in the battery pack.

If the temperature sensor can be accessed directly, this temperature monitoring may be conducted using an electrical circuit external to the battery pack. However, in many battery packs the temperature sensor cannot be accessed directly. Instead, the battery-monitoring mechanism may be interposed between the temperature sensor and the external electrical circuit. As a consequence, the temperature (or temperature state) is conveyed by the battery-monitoring mechanism on the signal lines along with other characteristic information.

For example, the temperature (or temperature state) may be included in a digital value output by the battery-monitoring mechanism as opposed to an analog signal. However, the use of a digital representation can pose challenges when controlling the charging of the battery pack, especially in the event of a hardware or software failure that disrupts the communication of the digital value. In these circumstances, the temperature of the battery pack cannot be monitored during charging, and safety issues can arise.

SUMMARY

The described embodiments include a power-management unit that receives and stores a representation of a temperature state of a battery pack (or a battery in the battery pack) from a battery-monitoring mechanism in the battery pack. For example, an interface circuit (such as a single-wire-interface or SWI circuit) may receive the information from the battery-monitoring mechanism via a signal line, and the information may be stored in a memory (such as a non-transitory computer-readable memory). This stored information is then used by a temperature-monitoring mechanism or circuit to determine the temperature state of the battery pack.

The SWI circuit may include a sniffer that receives the information, which is a subset of information communicated between the battery-monitoring mechanism and an integrated circuit on the signal line. Alternatively, the SWI circuit may communicate with the battery-monitoring mechanism in the battery pack via the signal line using a single-wire communication protocol.

In order to allow the temperature-monitoring mechanism to determine if the battery-monitoring mechanism continues to measure the temperature state, the stored information may include a timestamp that specifies when the battery-monitoring mechanism measured the temperature state of the battery pack. Furthermore, the power-management unit may store an indicator with the information when the information represents a valid temperature state of the battery pack. This indicator may be subsequently erased by the power-management unit (i.e., the indicator may self-erase or may expire) so that the temperature-monitoring mechanism can determine if the power-management unit continues to receive the information from the battery-monitoring mechanism.

Additionally, the power-management unit may include a charger coupled to at least a terminal of the battery in the battery pack. This charger may use a representation of a charging current through the battery, which may be included in the information, to determine the charging current and to charge the battery based on the determined charging current so that the battery can be charged at a higher nominal charging condition than in the absence of the charging-current feedback. For example, the charging condition may include: a current, a voltage, and/or a power.

Note that the temperature state may indicate whether it is safe to charge the battery pack.

Furthermore, the temperature-monitoring mechanism may include: digital logic that determines the temperature state of the battery pack (or the battery) based on the stored information; and/or a conversion circuit that converts the stored information into an analog signal prior to the determining of the temperature state of the battery pack.

In some embodiments, the power-management unit includes a wake circuit that detects a wake signal from the battery-monitoring mechanism on the signal line. This wake signal may transition an integrated circuit, which may be external to the power-management unit, from a power-saving mode (such as a 'sleep' mode) to a normal operating mode.

Another embodiment provides an electronic device that includes the battery pack, and the power-management unit, which is coupled to the battery pack by the signal line. This battery pack may include: a battery; a temperature sensor; the battery-monitoring mechanism that monitors characteristics of the battery; and the signal line, which is electrically coupled to the battery-monitoring mechanism. In some embodiments, the electronic device includes the integrated circuit that communicates with the battery-monitoring mechanism.

Another embodiment provides a method for determining the temperature state of the battery pack, which may be performed by the power-management unit. During operation, the power-management unit may receive, on the signal line, the representation of the temperature state of the battery pack (such as a digital value) from the battery-monitoring mechanism in the battery pack. Then, the power-management unit may store, in the memory, information that includes the representation of the temperature state of the battery pack. Moreover, the power-management unit may determine the temperature state of the battery pack based on the stored information.

Another embodiment provides a method for charging the battery in the battery pack, which may be performed by the power-management unit. During operation, the power-management unit may receive, on a signal line, a representation of the charging current from the battery-monitoring mechanism in the battery pack. Then, the power-management unit may store, in the memory, information that includes the representation of the charging current through the battery. Moreover, the power-management unit may determine the charging current through the battery based on the stored information. Next, the power-management unit may charge the battery based on the determined charging current using the charger (which may be external to the battery pack) so that the battery can be charged at a higher nominal charging condition than in the absence of the charging-current feedback.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
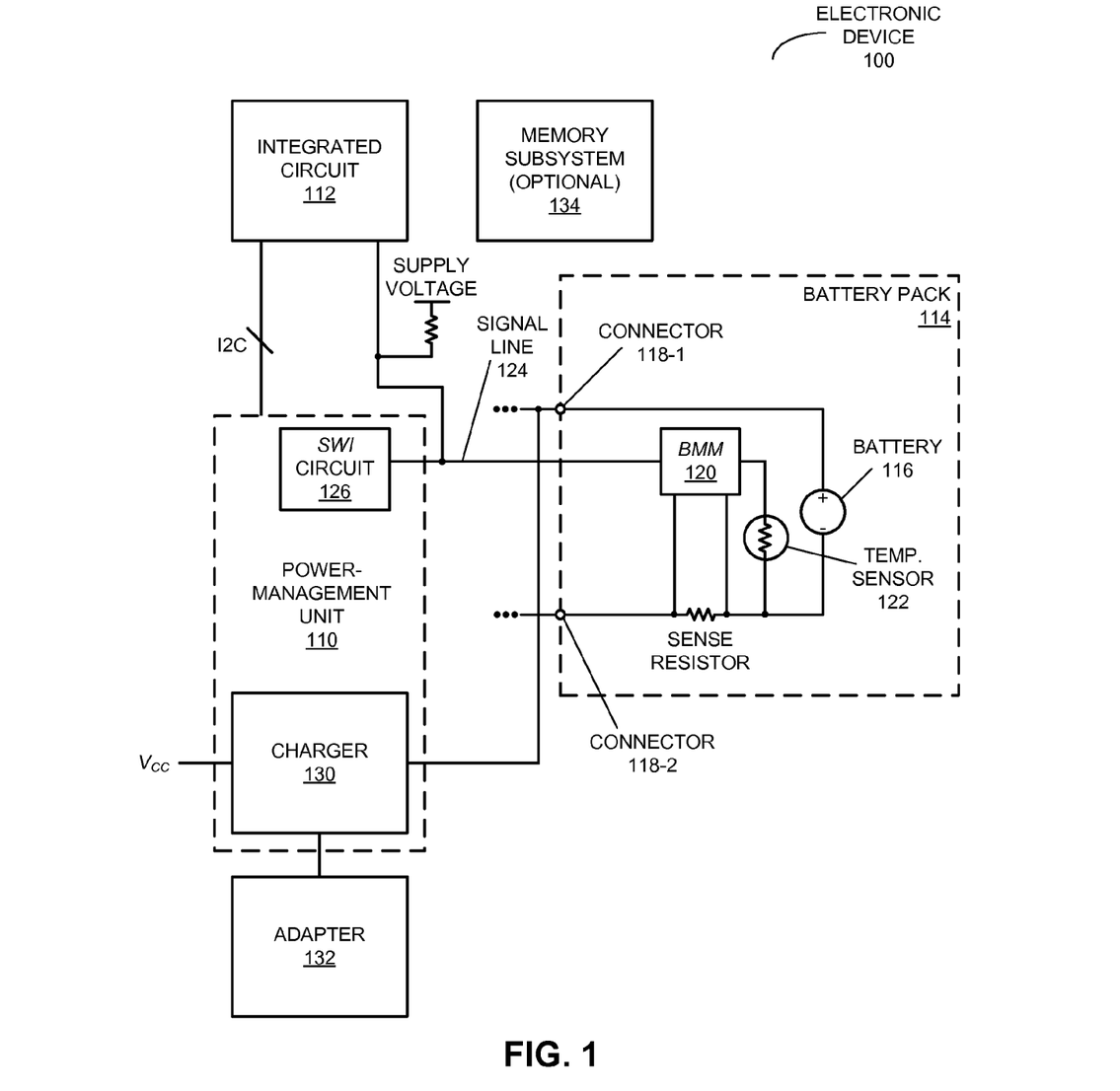
FIG. 1 presents a block diagram illustrating an electronic device that includes a power-management unit and a battery pack in accordance with an embodiment of the present disclosure.

FIG. 1 presents a block diagram illustrating an electronic device 100 that includes a power-management unit 110, an integrated circuit 112 (such as a processor, a graphics processor and/or a system-on-chip) and a battery pack 114. Battery pack 114 may include: a battery 116 that provides power to electronic device 100 via connectors 118; a battery-monitoring mechanism or BMM 120 (such as control logic and/or firmware, which is sometimes collectively referred to as a 'gas gauge') that monitors one or more physical characteristics of battery pack 114 and/or battery 116 (such as a voltage, a current, an internal impedance, a capacity, a charging time, etc.); a temperature sensor 122 (such as a thermistor) that can be used by battery-monitoring mechanism 120 to measure a temperature of battery pack 114 and/or battery 116; and a signal line 124, which electrically couples battery-monitoring mechanism 120 to power-management unit 110.

Note that battery pack 114 is electrically coupled to a remainder of electronic device 100 by three signal lines (instead of four), including those associated with power and ground connectors 118 (which are not shown for clarity) and signal line 124, which conveys data that includes characteristic information about battery pack 114 and/or battery 116, and which may be electrically coupled to a supply voltage (such as 1.8 V) via a pull-up resistor. As described below, this characteristic information may be used to gate and/or control charging of battery pack 114 and, thus, battery 116.

In particular, power-management unit 110 may include a single-wire interface (SWI) circuit 126. This SWI circuit may include a sniffer that receives a subset of the information communicated between battery-monitoring mechanism 120 and integrated circuit 112 on signal line 124. Therefore, in some embodiments integrated circuit 112 implements a single-wire communication protocol, such as HDQ serial data interface (from Texas Instruments, Inc. of Dallas, Tex.), for use in communicating data with battery-monitoring mechanism 120.

Figure 2:
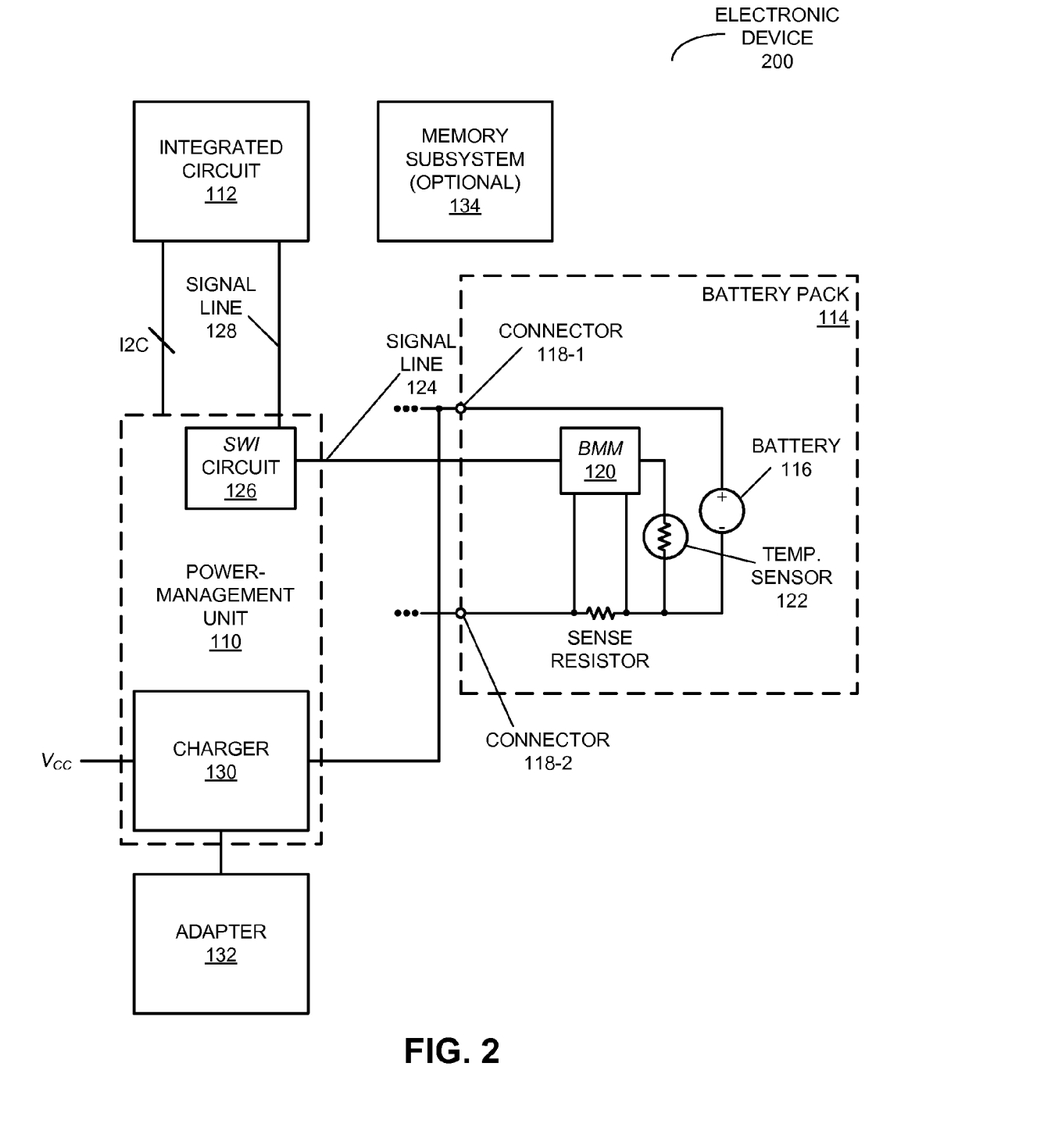
FIG. 2 presents a block diagram illustrating an electronic device that includes a power-management unit and a battery pack in accordance with an embodiment of the present disclosure.

Alternatively, as shown in FIG. 2, which presents a block diagram illustrating an electronic device 200, SWI circuit 126 may communicate with battery-monitoring mechanism 120 in battery pack 114 via signal line 124 using the single-wire communication protocol. In these embodiments, SWI circuit 126 receives the information from battery-monitoring mechanism 120. In addition, SWI circuit 126 may communicate at least some of the information to integrated circuit 112 via signal line 128. In the discussion that follows, embodiments of SWI circuit 126 that include a sniffer are used as illustrative examples.

Figure 3:
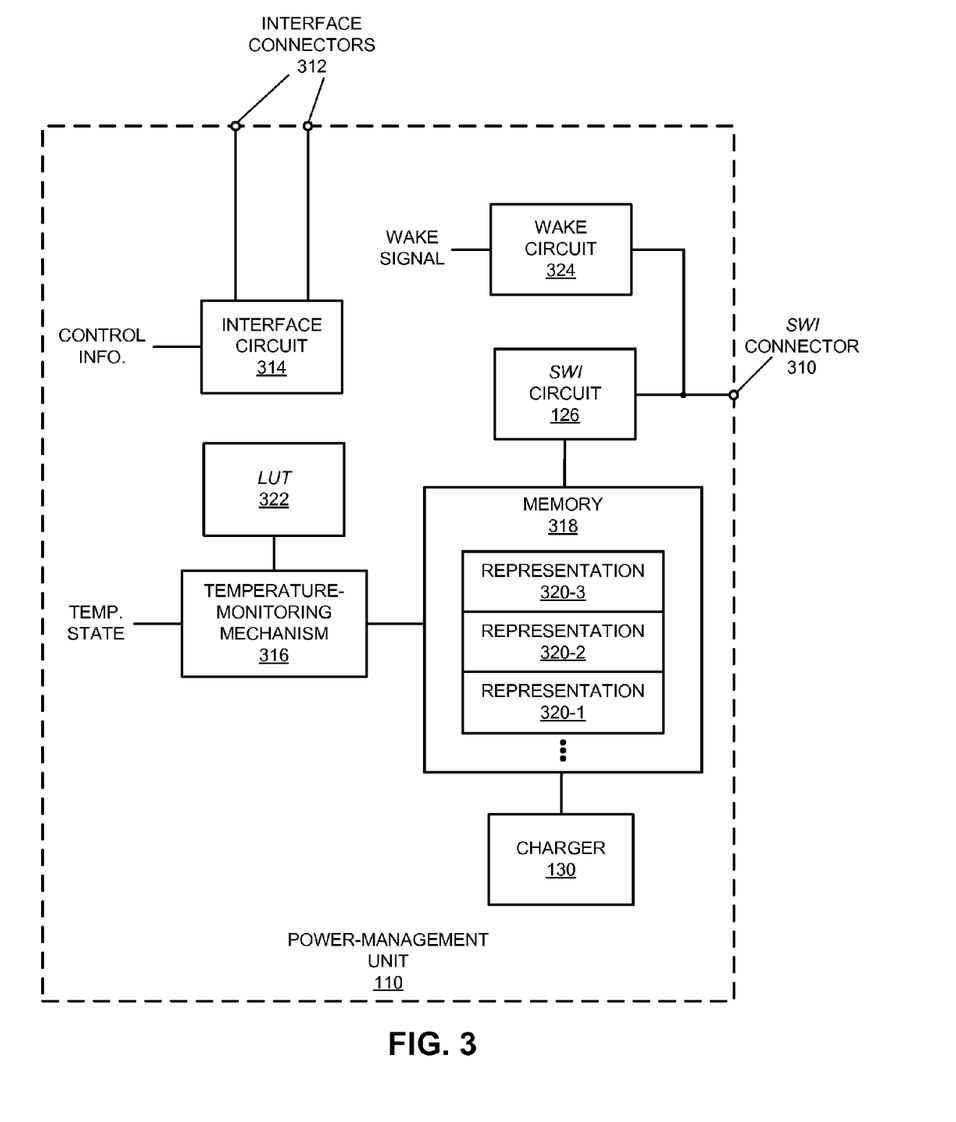
FIG. 3 presents a block diagram illustrating a power-management unit in the electronic devices of FIGS. 1 and 2 in accordance with an embodiment of the present disclosure.

FIG. 3 presents a block diagram illustrating power-management unit 110 (FIG. 1). Power-management unit 110 includes: an SWI connector 310 electrically coupled to signal line 124 (FIG. 1); SWI circuit 126; an interface circuit 314 that receives control information (such as one or more instructions, commands or signals) from integrated circuit 112 in FIG. 1 via interface connectors 312; a temperature-monitoring mechanism 316 (or a temperature-monitoring circuit); and memory 318. For example, the control information may be received via an I2C bus or interface (from NXP Semiconductors, Inc. of Eindhoven, The Netherlands). However, a wide variety of communication techniques and protocols can be used to convey the control information from integrated circuit 112 (FIG. 1) to power-management unit 110, such as a Serial Peripheral Interface Bus.

Figure 4:
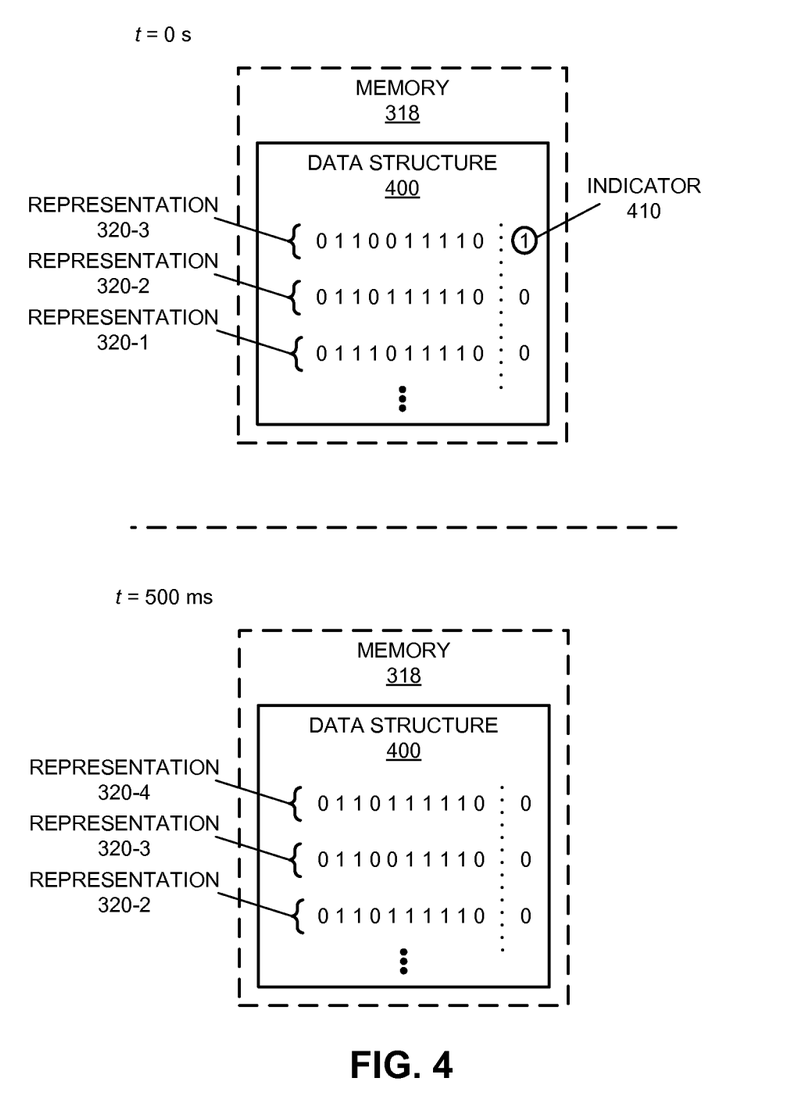
FIG. 4 presents a block diagram illustrating a data structure in a memory in the power-management unit of FIG. 3 in accordance with an embodiment of the present disclosure.

The subset of the information received by SWI circuit 126 may include a representation of the characteristic information (for example, a digital value), which may specify a temperature (or, more generally, a temperature state) of battery pack 114 and/or battery 116, and/or a charging current through battery 116. After receiving this representation, SWI circuit 126 may store it as one of representations 320 in memory 318 (such as a non-transitory computer-readable memory, such as DRAM). For example, as described further below with reference to FIG. 4, representations 320 may include 10-bit values.

Subsequently, temperature-monitoring mechanism 316 may use one or more of representations 320 (i.e., the stored information) to determine the temperature state of battery pack 114 and/or battery 116 in FIG. 1. For example, temperature-monitoring mechanism 316 may include digital logic that determines the temperature state based on the stored information and/or a data structure, such as threshold values in a look-up table (LUT) 322 that specify safe or unsafe temperature states based on ranges of temperatures. Alternatively or additionally, temperature-monitoring mechanism 316 may include a conversion circuit that converts the stored information into an analog signal prior to the determining of the temperature state.

Referring back to FIG. 1, note that the temperature state may indicate whether it is safe to charge battery 116 in battery pack 114. Therefore, the temperature state may include an absolute or relative temperature of battery pack 114 and/or battery 116. For example, in embodiments where temperature sensor 122 includes a thermistor, the resistance may vary between approximately 2 and 50 kΩ depending on the temperature of battery pack 114 and/or battery 116. In these embodiments, the characteristic information may include a digital value that represents an analog signal measured by driving current through temperature sensor 122. However, in some embodiments the temperature state includes: a thermal condition of battery pack 114 and/or battery 116, such as 'safe to charge' or 'unsafe to charge'; and/or a constraint on the charging of battery pack 114 and/or battery 116 based on the temperature state (such as a charging current that may not exceed 800, 900 or 1000 mA).

As a consequence, power-management unit 110 may provide the temperature state when battery pack 114 is coupled to a charger 130 (which receives power from an adapter 132 that can convert household alternating current (AC) electricity into direct current (DC) electricity for use by electronic device 100). For example, charger 130 may be electrically coupled to at least a terminal of battery pack 114, such as connector 118-1 (with a return path provided via GND in electronic device 100). Note that, for safety reasons, power-management unit 110 may provide the temperature state periodically, such as every 10 ms. More generally, the monitoring period may be selected based on a thermal time constant of battery pack 114 and/or battery 116, so that the temperature state does not change appreciably between determinations of the temperature state by temperature-monitoring mechanism 316 in FIG. 3.

To facilitate accurate charging, representations 320 in memory 318 (FIG. 3) may be used by charger 130 to implement charging-current feedback. In particular, battery-monitoring mechanism 120 may measure the charging current through battery 116 using a sense resistor. This measured charging current may be more accurate than if the measurement were performed by a circuit external to battery pack 114. Furthermore, the information communicated by battery-monitoring mechanism 120 to SWI circuit 126 may include the measured charging current, which is then stored in memory 318 (FIG. 3). Subsequently, charger 130 may use a representation of the charging current through battery 116 (such as one of representations 320 in FIG. 3) to determine the charging current and to charge battery 116 based on the determined charging current so that battery 116 can be charged at a higher nominal charging condition than in the absence of the charging-current feedback. For example, the charging condition may include: a current, a voltage, and/or a power. Thus, the nominal charging condition may be at 1000 mA, instead of 800 or 900 mA.

In some embodiments where a host (e.g., integrated circuit 112) is in a power-saving mode (such as a 'sleep' mode), signal line 124 can be used to convey a wake signal from battery-monitoring mechanism 120 to transition the host to a normal operating mode (i.e., in embodiments where battery-monitoring mechanism 120 is temporarily a 'master' and integrated circuit 112 is temporarily a 'slave,' signal line 124 may be used to indicate that a condition has occurred, such as a low battery voltage, where battery-monitoring mechanism 120 wants to wake integrated circuit 112 and make it the master). This is shown in FIG. 3. In particular, power-management unit 110 may include a wake circuit 324 that detects the wake signal. For example, the wake signal may be a high-to-low conversion on signal line 124 (FIG. 1) while this signal line or bus idles at nominally 1.8 V. Moreover, wake circuit 324 may include a buffer or a logic gate that can detect a digital value representing the wake signal. (Therefore, wake circuit 324 may function as a General Purpose Input/Output pin.) This digital value may be subsequently conveyed to integrated circuit 112 (FIG. 1). Similarly, in FIG. 1, control information that temporarily makes battery-monitoring mechanism 120 a 'master' and integrated circuit 112 a 'slave' may be communicated from integrated circuit 112 to battery-management mechanism 120 via signal line 124. (Thus, the single-wire protocol may support master handoff via signal line 124.)

For safety reasons, a variety of fail-safe procedures may be implemented when communicating the characteristic information and/or when storing it in memory 318. For example, in order to allow temperature-monitoring mechanism 316 to determine if battery-monitoring mechanism 120 (FIG. 1) continues to measure the temperature state, the stored information in memory 318 may include a timestamp that specifies when battery-monitoring mechanism 120 (FIG. 1) measured the temperature state of battery pack 114 and/or battery 116 (FIG. 1). Thus, if the timestamps in successive representations 320 are unchanged, temperature-monitoring mechanism 316 may modify the output temperature state to stop charging of battery pack 114 (FIG. 1).

Furthermore, power-management unit 110 may store an indicator with the information when the information represents a valid temperature state of battery pack 114 and/or battery 116 (FIG. 1). This is shown in FIG. 4, which presents a block diagram illustrating a data structure 400 in memory 318 (FIG. 3). This data structure includes representations 320 of characteristic information provided by battery-monitoring mechanism 120 (FIG. 1). If a given representation, such as representation 320-3, includes a valid temperature state, an indicator (such as '1' indicator 410) may be included when representation 320-3 is stored (at t=0 in FIG. 4). After a time interval (such as 500 ms and, more generally, a thermal time constant of battery pack 114 and/or battery 116 in FIG. 1), control logic in power-management unit 110 (FIG. 1) may erase indicator 410 (and, more generally, the indicators may self-erase or may expire) so that temperature-monitoring mechanism 316 (FIG. 3) can determine if power-management unit 110 (FIG. 1) continues to receive the information from battery-monitoring mechanism 120 (FIG. 1). In this way, representations 320 may be used to ensure safe and accurate charging of battery pack 114 (FIG. 1).

Figure 5:
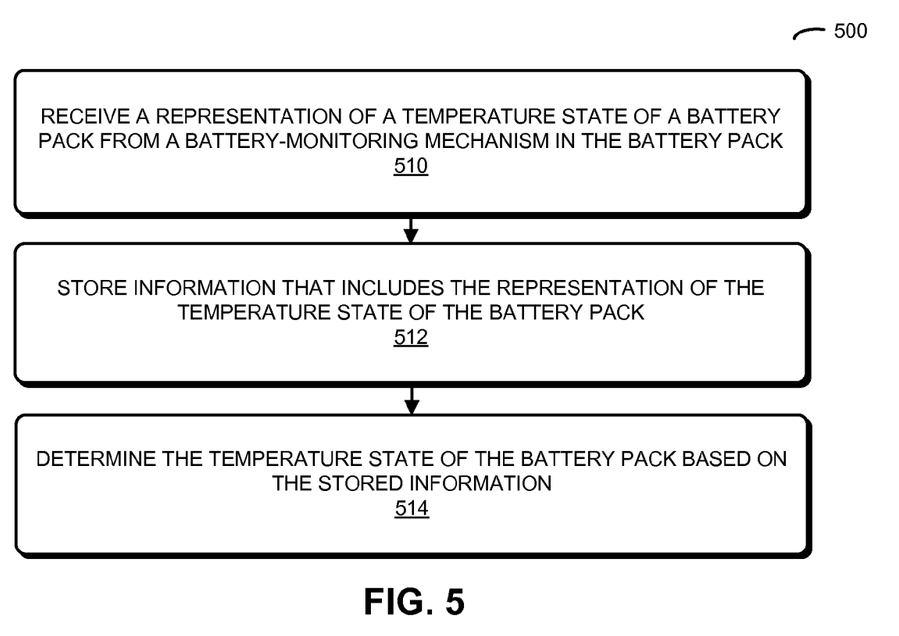
FIG. 5 presents a flowchart illustrating a method for determining a temperature state of a battery pack in accordance with an embodiment of the present disclosure.

We now describe embodiments of methods. FIG. 5 presents a flowchart illustrating a method 500 for determining a temperature state of a battery pack, which may be performed by a power-management unit (such as power-management unit 110 in FIG. 1). During operation, the power-management unit may receive, on a signal line, a representation of a temperature state of the battery pack (such as a digital value) from a battery-monitoring mechanism in the battery pack (operation 510). Then, the power-management unit may store, in a memory, information that includes the representation of the temperature state of the battery pack (operation 512). Moreover, the power-management unit may determine the temperature state of the battery pack based on the stored information (operation 514).

Figure 6:
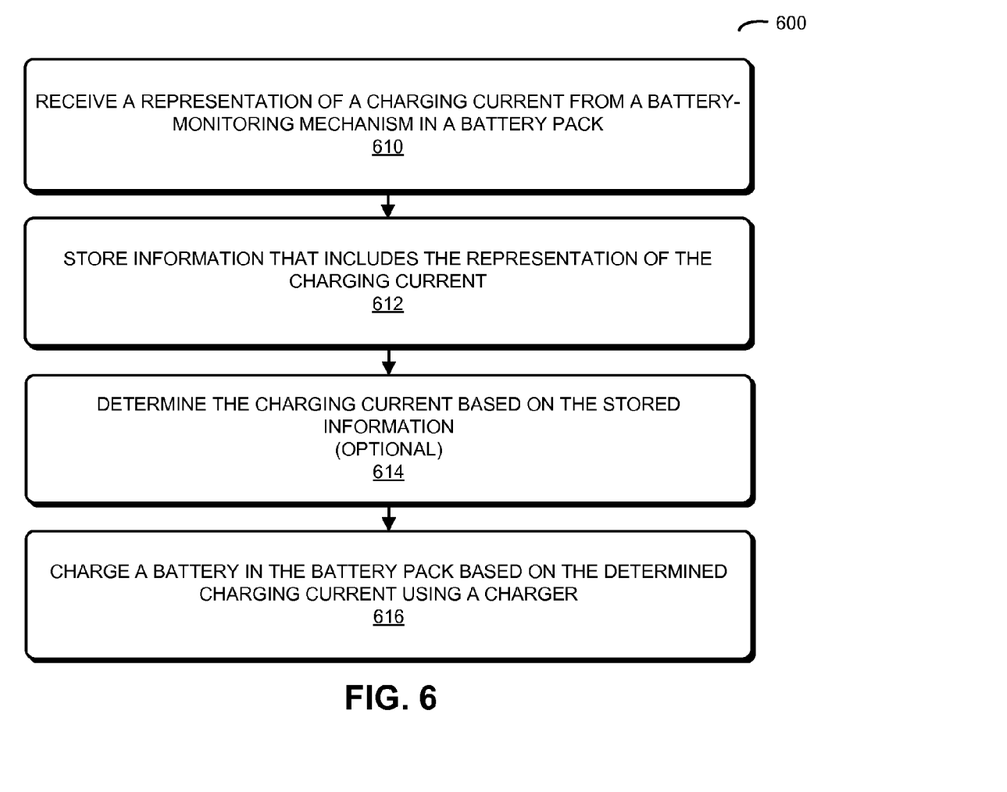
FIG. 6 presents a flowchart illustrating a method for charging a battery in a battery pack in accordance with an embodiment of the present disclosure.

FIG. 6 presents a flowchart illustrating a method 600 for charging a battery in a battery pack, which may be performed by a power-management unit (such as power-management unit 110 in FIG. 1). During operation, the power-management unit may receive, on a signal line, a representation of a charging current from a battery-monitoring mechanism in the battery pack (operation 610). Then, the power-management unit may store, in a memory, information that includes the representation of the charging current through the battery (operation 612). Moreover, the power-management unit may optionally determine the charging current through the battery based on the stored information (operation 614). Next, the power-management unit may charge the battery based on the determined charging current using a charger (operation 616) (which may be external to the battery pack) so that the battery can be charged at a higher nominal charging condition than in the absence of charging-current feedback.

In some embodiments of methods 500 (FIG. 5) and 600, there may be additional or fewer operations. Moreover, the order of the operations may be changed, and/or two or more operations may be combined into a single operation.

Referring back to FIG. 1, in general functions of the power-management unit 110 may be implemented in hardware to ensure safe and reliable operation even in the face of software and/or component failures. However, in some embodiments at least some of the operations performed in electronic devices 100 and 200 (FIG. 2) are implemented in software. Thus, electronic devices 100 and 200 (FIG. 2) may include one or more program modules or sets of instructions stored in an optional memory subsystem 134 (such as DRAM or another type of volatile or non-volatile computer-readable memory), which may be executed by a processing subsystem in integrated circuit 112. (In general, the power-management technique may be implemented more in hardware and less in software, or less in hardware and more in software, as is known in the art.) Note that the one or more computer programs may constitute a computer-program mechanism. Furthermore, instructions in the various modules in optional memory subsystem 134 may be implemented in: a high-level procedural language, an object-oriented programming language, and/or in an assembly or machine language. Note that the programming language may be compiled or interpreted, e.g., configurable or configured, to be executed by the processing subsystem.

Components in electronic devices 100 and 200 (FIG. 2) may be coupled by signal lines, links or buses. While electrical communication has been used as an illustrative example, in general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, the circuits and components may be implemented using bipolar, PMOS and/or NMOS gates or transistors, and signals in these embodiments may include digital signals that have approximately discrete values and/or analog signals that have continuous values. Additionally, components and circuits may be single-ended or differential, and power supplies may be unipolar or bipolar.

Furthermore, charger 130 may include any combination of hardware and/or software implemented using analog and/or digital circuitry, and may include one or more processors, and volatile and nonvolatile memory. In some embodiments, charger 130 includes more than one chip or chip set, and in other embodiments charger 130 may operate in conjunction with a system management controller (SMC) in integrated circuit 112 that performs some of the functions of charger 130. In these embodiments, the charger and SMC may operate in a master-slave or slave-master configuration. Note that charger 130 may be external to power-management unit 110.

Additionally, battery pack 114 can be any type of battery pack capable of powering electronic devices 100 and 200 (FIG. 2), and can be implemented in any technology. In some embodiments, battery pack 114 includes more than one separate battery and/or battery cell.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Electronic devices 100 and 200 (FIG. 2) may include a variety of devices that can include a battery pack, and that can receive electrical current from an adapter and a charger, including: a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although we use specific components to describe electronic devices 100 and 200 (FIG. 2), in alternative embodiments, different components and/or subsystems may be present in electronic devices 100 and 200 (FIG. 2). For example, battery pack 114 may include a protective circuit to prevent battery 116 from being damaged during operation. Furthermore, in FIG. 2, power-management unit 110 may include an integrated-circuit (IC) connector that electrically couples to integrated circuit 112 via signal line 128. Additionally, one or more of the components may not be present in electronic devices 100 and 200 (FIG. 2). In some embodiments, electronic devices 100 and 200 (FIG. 2) include one or more additional components that are not shown in FIGS. 1 and/or 2. Also, although separate components are shown in FIGS. 1 and 2, in some embodiments, some or all of a given component can be integrated into one or more of the other components in electronic devices 100 and 200 (FIG. 2) and/or positions of components in electronic devices 100 and 200 (FIG. 2) can be changed.

In the preceding description, we refer to 'some embodiments.' Note that 'some embodiments' describes a subset of all of the possible embodiments, but does not always specify the same subset of the embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A power-management unit, comprising:
   a single-wire-interface (SWI) circuit configured to receive charging current feedback including charging current information and a representation of a temperature state of a battery pack from a battery-monitoring mechanism in the battery pack via a signal line, wherein the power-management unit is external to the battery pack;
   a memory coupled to the SWI circuit and configured to store at least the representation of a temperature state of the battery pack;
   a temperature-monitoring mechanism coupled to the memory and configured to determine the temperature state of the battery pack based on the stored information; and
   a charger coupled to the memory and the temperature monitoring mechanism, operatively coupled to the SWI circuit, and configured to be coupled to a battery in the battery pack;
   wherein the charger is configured to charge the battery based on the charging current feedback so that the battery can be safely charged at a higher nominal charging condition than in the absence of the charging current feedback.

2. The power-management unit of claim 1, wherein the SWI circuit includes a sniffer that is configured to receive the charging current feedback, which is a subset of information communicated between the battery-monitoring mechanism and an integrated circuit on the signal line.

3. The power-management unit of claim 1, wherein the charging current feedback includes a timestamp that specifies when the battery-monitoring mechanism measured the temperature state of the battery pack so that the temperature-monitoring mechanism can determine if the battery-monitoring mechanism continues to measure the temperature state.

4. The power-management unit of claim 1, wherein the power-management unit is configured to store an indicator with the representation of a temperature state of a battery pack when the representation represents a valid temperature state of the battery pack; and
   wherein the power-management unit is configured to subsequently erase the indicator after a time interval so that the temperature-monitoring mechanism can determine if the power-management unit continues to receive the representation of a temperature state of a battery pack from the battery-monitoring mechanism.

5. The power-management unit of claim 1, wherein the charging condition includes one of: a current, a voltage, and a power.

6. The power-management unit of claim 1, wherein the temperature-monitoring mechanism includes one of:
   digital logic configured to determine the temperature state of the battery pack based on the stored information; and
   a conversion circuit configured to convert the stored information into an analog signal prior to the determining of the temperature state of the battery pack.

7. The power-management unit of claim 1, wherein the power-management unit further comprises a wake circuit configured to detect a wake signal from the battery-monitoring mechanism on the signal line; and
   wherein the wake signal transitions an integrated circuit, which is external to the power-management unit, from a power-saving mode to a normal operating mode.

8. An electronic device, comprising:
   a battery pack, the battery pack including:
     a battery;
     a temperature sensor; and
     a battery-monitoring mechanism coupled to the battery and the temperature sensor and configured to monitor characteristics of the battery and provide charging current feedback including charging current information and a representation of a temperature state of the battery pack;
   a signal line coupled to the battery-monitoring mechanism; and
   a power-management unit, wherein the power-management unit includes:
     a single-wire-interface (SWI) circuit configured to receive the charging current feedback from the battery-monitoring mechanism via the signal line;
     a memory coupled to the SWI circuit and configured to store at least the representation of the temperature state of the battery;
     a temperature-monitoring mechanism coupled to the memory and configured to determine the temperature state of the battery based on the stored information; and
     a charger coupled to the memory and configured to couple to the battery and configured to determine a charging condition from the stored information so that the battery can be charged at a higher nominal charging condition than in the absence of the charging current feedback.

9. The electronic device of claim 8, further comprising an integrated circuit operatively coupled to the battery pack and configured to receive at least a subset of information communicated from the battery pack via the signal line.

10. The electronic device of claim 8, wherein the charging current feedback includes a timestamp that specifies when the battery-monitoring mechanism measured the temperature state of the battery pack via the temperature sensor so that the temperature-monitoring mechanism can determine if the battery-monitoring mechanism continues to measure the temperature state.

11. The electronic device of claim 8, wherein the power-management unit is configured to store an indicator with the representation of the temperature state of the battery when the representation represents a valid temperature state of the battery pack; and wherein the power-management unit is configured to subsequently erase the indicator after a time interval so that the temperature-monitoring mechanism can determine if the power-management unit continues to receive the representation of a temperature state of the battery pack from the battery-monitoring mechanism.

12. The electronic device of claim 8, wherein the SWI circuit is configured to communicate with the battery-monitoring mechanism in the battery pack via the signal line using a single-wire communication protocol.

13. The electronic device of claim 8, wherein the charging condition includes at least one of: a current, a voltage, and a power.

14. The electronic device of claim 8, wherein the temperature state indicates whether it is safe to charge the battery pack.

15. The electronic device of claim 8, wherein the temperature-monitoring mechanism includes one of:

digital logic configured to determine the temperature state of the battery pack based on the stored information; and a conversion circuit configured to convert the stored information into an analog signal prior to the determining of the temperature state of the battery pack.

16. The electronic device of claim 8, wherein the power-management unit further comprises a wake circuit configured to detect a wake signal from the battery-monitoring mechanism on the signal line; and wherein the wake signal transitions an integrated circuit, which is external to the power-management unit, from a power-saving mode to a normal operating mode.

* * * * *